Oct. 18, 1927.  
W. J. ANDRES  
1,645,846  
BRAKE OPERATING CONNECTION  
Filed July 25, 1925
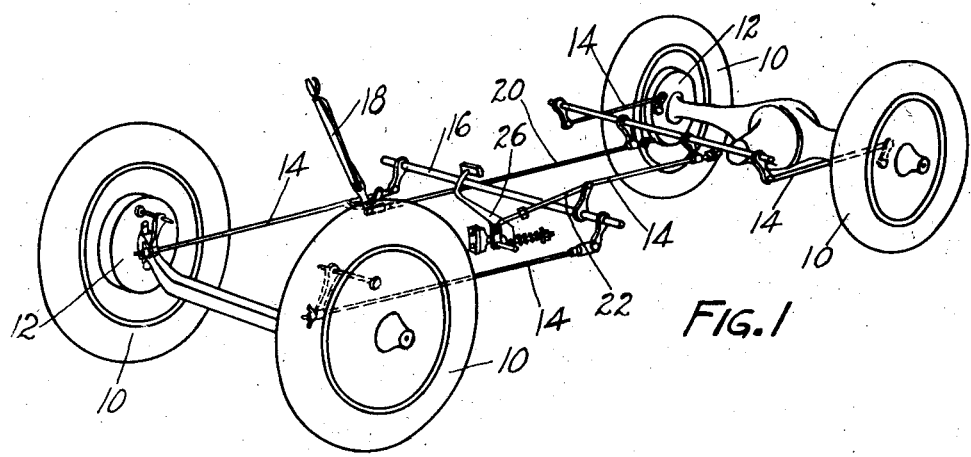
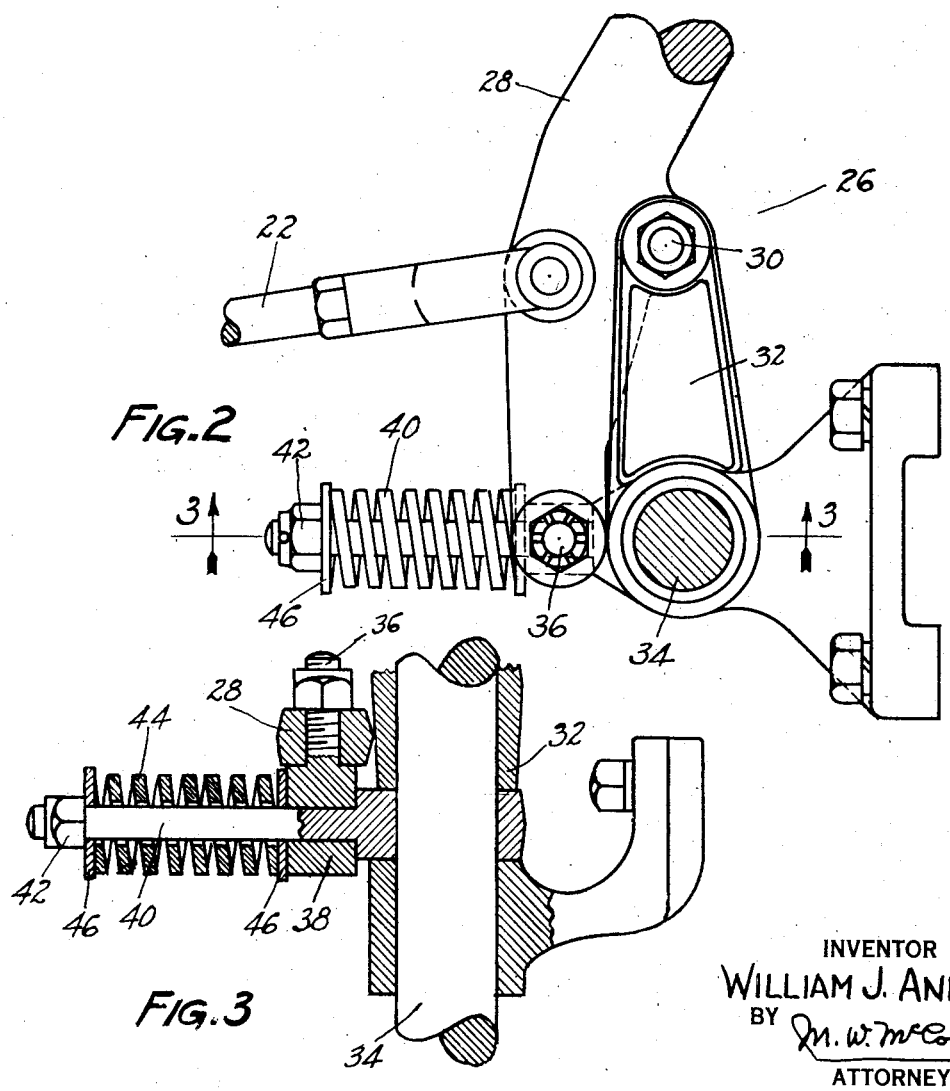
INVENTOR  
WILLIAM J. ANDRES  
BY  
M. W. McConkey  
ATTORNEY Patented Oct. 18, 1927.

1,645,846

UNITED STATES PATENT OFFICE.

WILLIAM J. ANDRES, OF SOUTH BEND, INDIANA.

BRAKE-OPERATING CONNECTION.

Application filed July 25, 1925. Serial No. 46,038.

This invention relates to brakes, and is illustrated as embodied in an automobile chassis having brakes on all four wheels.

An object of the invention is yieldingly to limit the pressure which can be applied to the brakes, to prevent locking the wheels, by a spring arranged normally to constrain the brake pedal or equivalent to turn about its fulcrum, but yieldable in case of excessive pressure so that the pedal will rest on the floor-board before the wheels are locked, while at the same time the spring exerts a uniform pressure on the brakes as long as the pedal is held down.

Preferably the pedal, or other operating lever, is in two parts normally held in operative alinement by the above-described spring.

The above and other objects and features of the invention, including various novel combinations of parts and desirable particular constructions, will be apparent from the following description of one illustrative embodiment shown in the accompanying drawings, in which:

Figure 1 is a diagrammatic perspective of the principal parts of the chassis;

Figure 2 is a vertical section showing the bottom of the pedal in side elevation; and Figure 3 is a horizontal section on the line 3—3 of Figure 2.

In the arrangement illustrated, the chassis comprises wheels 10 having brakes 12 operated by links 14 from a rock-shaft 16 carried by the frame (not shown). An emergency lever 18 may, if desired, be arranged to operate the rear brakes through a link 20.

Shaft 16 is rocked to apply the brakes by a link 22 connected to a novel two-part lever shown as the service brake pedal 26. The upper part 28 of this lever is arranged to be depressed in the usual manner by the driver, and is pivotally connected at 30 to the lower part 32, mounted on the fulcrum shaft 34. The lower end of part 28 extends below pivot 30, in effect overlapping part 32, and embraces a stud 36 operating a sleeve 38 slidably mounted on a part 40 having a hub sleeved on shaft 34. At the rear end of part 40 is threaded an adjustable nut 42. A spring 44 sleeved on part 40 is confined between two washers 46 engaged respectively by nut 42 and by sleeve 38.

In operation, when the pedal is depressed, up to a predetermined pressure determined by the adjustment of nut 42, parts 28 and 32 turn as a unit about shaft 34, and the brakes are applied as with an ordinary pedal. If, however, excessive pressure is applied, spring 44 yields, permitting separation of the bottom of part 28 from the shaft 34, and allowing the footplate of the pedal to engage the floor board (not shown). While the pedal is so held, spring 44 keeps a uniform pressure on the brakes.

While one illustrative embodiment of the invention is described, it is not my intention to limit its scope to that particular embodiment, or otherwise than by the terms of the appended claims.

I claim:

1. Brake-operating connections comprising, in combination, a two-part lever, one part of which is operable by the driver to apply the brakes, a fulcrum for the other part of the lever, said two parts of the lever pivotally connected at a point remote from the fulcrum, and a spring constraining the two parts of the lever to turn together about the fulcrum and yieldable in case of excessive pressure to allow relative movement of the two parts of the lever to limit the force applied to the brakes.

2. Brake-operating connections comprising, in combination, a two-part lever connected to operate the brakes, a fulcrum for the lower part of the lever, a pivotal connection between the parts of the lever, and a spring holding the upper part of the lever yieldingly in operative relationship with the lower part and yieldable to permit relative movement of the two parts of the lever in case excessive force is applied to the upper part of the lever.

3. Brake-operating connections comprising, in combination, a two-part lever connected to operate the brakes, a fulcrum for the lower part of the lever, a pivot connection between the upper end of the lower part of the lever, and said upper part extending below the pivot, and a spring holding the bottom end of the upper part of the lever yieldingly against the lower part of the lever.

4. Brake operating connections comprising, in combination, a two-part lever consisting of an upper operably disposed part and a lower part pivoted at its upper end to an intermediate point on the upper part and fulcrumed at its lower end, a connecting link to the upper part of the lever to a point above said fulcrum and means constraining the two parts of the lever to turn as one piece about the fulcrum, said means yieldable to prevent relative movement of the two parts of the lever.

5. Brake operating connections comprising, in combination, a lever consisting of an upper operably disposed part and a lower part pivoted at one end to the upper part and fulcrumed at the opposite end to support the lever, a link connected with the upper part of the lever above said fulcrum point and means yieldably connecting the lower part of the lever adjacent said fulcrum point with the upper part of the lever below its point of pivotal connection with the lower part of the lever tending to constrain the two parts of the lever to pivot about said fulcrum point as a unit.

6. Brake operating connections comprising, in combination, a lever consisting of an upper operably disposed part and a lower part pivotally connected at one end therewith and fulcrumed at its opposite end, the upper part of said lever extending beyond its pivotal connection with the lower part toward said fulcrum, and means constraining the lower end of the upper part of the lever to swing with the lower part of the lever about said fulcrum point yieldable to permit relative separation of said parts of the lever.

7. Brake operating connections comprising, in combination, a lever consisting of two pivotally connected parts, one part being operably disposed, the other part being fulcrumed at the end remote from its pivotal connection with the first part, a support pivoted to said fulcrum, means carried by said support constraining such lever to fulcrum as a unit but yieldable to permit relative movement of the two parts of the lever.

In testimony whereof I have hereunto signed my name.

WILLIAM J. ANDRES.